United States Patent
Cottrell

[15] 3,664,454
[45] May 23, 1972

[54] DEADMAN SEAT ACTUATED BRAKE
[72] Inventor: Samuel H. Cottrell, Mound, Minn.
[73] Assignee: White Farm Equipment Company
[22] Filed: June 5, 1970
[21] Appl. No.: 43,854

[52] U.S. Cl..................180/101, 74/520, 188/109
[51] Int. Cl........................................B60b 7/12
[58] Field of Search..............180/101, 102; 74/520, 521; 200/86; 188/109

[56] References Cited

UNITED STATES PATENTS

| | | | |
|---|---|---|---|
| 3,259,203 | 7/1966 | Ryskamp | 180/101 |
| 1,542,341 | 6/1925 | Deckert | 74/520 X |
| 3,213,707 | 10/1965 | McCann et al. | 74/520 |

FOREIGN PATENTS OR APPLICATIONS 813,092  5/1959  Great Britain..........................74/520

OTHER PUBLICATIONS

Product Engineering - 1953 Annual Handbook, "Toggle Linkage Applications in Different Mechanisms," pp. 26 & 27.

*Primary Examiner*—Benjamin Hersh
*Assistant Examiner*—John P. Silverstrim
*Attorney*—Watts, Hoffmann, Fisher & Heinke

[57] ABSTRACT

A spring for urging the application brakes of a fork-lift truck is overpowered by a toggle joint moved toward its dead center by depression of the knee thereof by the weight of the operator in the operator's seat. The mechanical advantage provided by the toggle joint between the seat and the brake-applying spring is such that the seat may bounce normally without permitting application of the brake. Further, the seat can be tilted forwardly for access to the truck without additional attention to disconnection and reconnection of parts.

19 Claims, 4 Drawing Figures

INVENTOR.
SAMUEL H. COTTRELL
BY Watts, Hoffmann,
Fisher & Heinke
ATTORNEYS.

INVENTOR.
SAMUEL H. COTTRELL
BY Watts, Hoffmann,
Fisher & Heinke
ATTORNEYS

DEADMAN SEAT ACTUATED BRAKE

CROSS REFERENCE TO RELATED APPLICATION

An application entitled "Deadman Seat Actuated Brake and Handbrake Construction" filed concurrently by S. R. Montgomery and bearing Ser. No. 44,385.

BACKGROUND OF THE INVENTION

1. Field of the Invention

The present invention is directed to vehicle brake-actuating mechanisms and more particularly to a so-called "deadman" brake actuating mechanism for vehicles having an operator's seat, and which mechanisms automatically apply the brakes whenever the operator's seat is unoccupied.

2. Prior Art.

In the past, vehicles such as fork-lift trucks and golf carts have been equipped with devices known as deadman brakes. In such vehicles, the typical deadman brake is actuated by the operator's seat. Usually, the seat is spring biased upwardly so that when the operator leaves the truck, the seat elevates. Elevation of the seat actuates a mechanism which causes brakes to be applied.

Prior deadman brake proposals have included mechanical linkages which apply the brakes when the seat is elevated and release them when the seat is depressed. Among other deficiencies, these linkages have been susceptible to intermittent, unintended brake applications when the vehicle is traversing rough terrain. For example, if a fork-lift truck equipped with one of the prior art deadman linkages passed over a bump at a relatively great rate of speed, the bouncing of the driver could cause unintended and undesired brake application. Prior mechanical linkages have failed to accommodate the bouncing in that they are typically designed such that the maximum rate of brake application occurs as the seat commences to rise. Since the maximum rate of brake application occurs as the seat commences to rise, the amount of bouncing which can be accommodated without unintended brake application is minimized.

The prior deadman brakes have often had other disadvantages. In some instances, the mechanical connections between the seat and brake-actuating mechanisms were unduly complicated. In addition to the complexity in assembly and the cost resulting from unduly complex mechanisms, they also had the disadvantage of impeding removal of the seat and access to the truck mechanism beneath the seat.

THE PRESENT INVENTION

The present invention has a new and improved vehicle brake-actuating mechanism in which the brakes are maintained in a released position against a spring actuator. The brakes are held in a released condition by a toggle joint held approximate to a straight line or dead center position by the weight of the vehicle operator. The weight of the operator is applied to the knee of the toggle joint by a connection with the seat.

The mechanical advantage of the movement of the seat in overcoming the force of the brake-actuating spring is such that the seat may bounce through a relatively considerable range without corresponding movement of the brake-applying mechanism. This relatively large range of bouncing is achieved through the provision of the toggle joint which is substantially at straight line or dead-center position when the brakes are released. Because of this, the rate of brake application is initially at a low rate and increases as the seat is raised and the toggle joint flexes such that its effective length is shortened.

Accordingly, a major object of the invention is the provision of a new and improved seat-controlled vehicle-brake-actuating mechanism of the deadman type mentioned.

Another object of the invention is the provision of a deadman-brake construction which can be assembled as a unit and readily and inexpensively installed in a truck.

Other objects and advantages of the invention will be apparent from the following description of a preferred form thereof, reference being made to the accompanying drawings in which.

BRIEF DESCRIPTION OF THE PREFERRED EMBODIMENT

Figure 1:
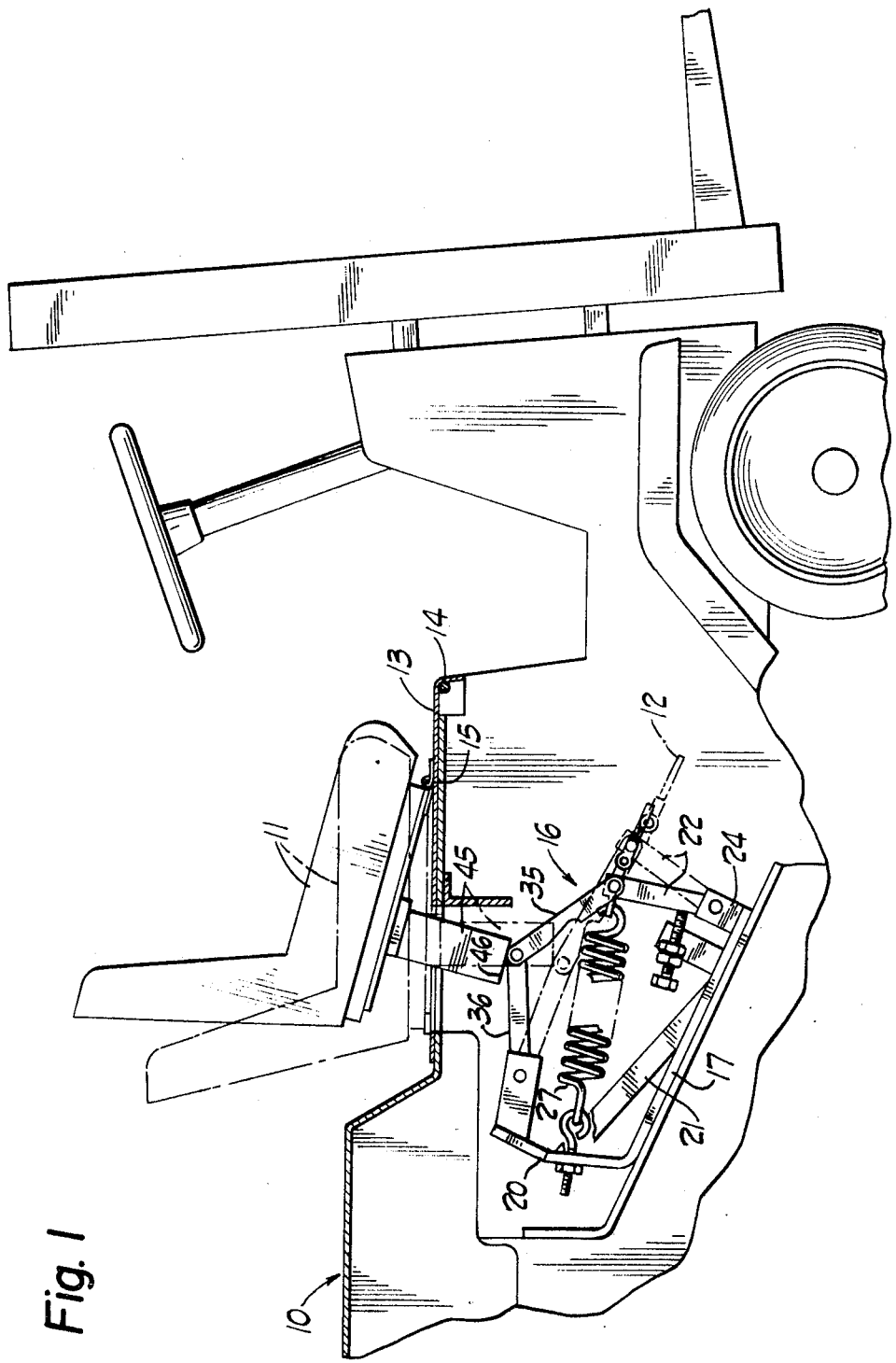
FIG. 1 is a fragmentary side view of a fork-lift truck embodying the invention.

Referring to the drawings, a fork-lift truck is shown at 10. The truck 10 includes a operator's seat 11 and a brake mechanism which is actuated by movement of suitable linkage, a portion of which is shown at 12. The brake mechanism is of conventional construction and the details thereof are unnecessary to an understanding of the present invention. Suffice it to say the brake mechanism applies the brakes when the link 12 is moved to the left, as viewed in FIGS. 1 and 2, and the brakes are released when the link moves to the right.

The truck 10 includes a hood 13 which encloses part of the truck mechanism and forms a support for the seat 11. The hood is hinged to the truck body at 14 so that it may be swung forwardly for access to the interior of the truck. The forward portion of the seat 11 is pivoted to the hood at 15 and may be moved about its pivot relative to the hood, as viewed in FIG. 1.

A brake-actuating assembly is shown generally at 16. When the seat 11 is unoccupied, the brake linkage 12 is shifted to the left, as shown in full lines in FIG. 1, to apply the brakes of the truck by the brake-actuating assembly 16. When the seat is occupied, the brake-actuating assembly is overpowered and the linkage 12 is shifted to the right to release the brakes.

The actuating assembly 16 has a base 17. The base 17 is preferably formed of a metal bar bent adjacent one end thereof to provide an upright portion 20. A brace bar 21 is welded between the base proper and the upright portion 20 to provide rigidity to the base. The base 17 is attached to the frame of the truck below the seat 11 by suitable means, not shown.

An actuator arm 22 is pivotally connected to the forward end of the base 17 by a pin 23. The pin 23 is supported in openings through a pair of spaced lugs 24 welded to the base. The linkage 12 is connected to the upper end of the arm 22, a pin 23a, a lug 25, and a clevis and pin 26.

The arm 22 is urged counterclockwise about its pivot by a brake-actuating tension spring 27. One end of the spring 27 is attached to an eye 30 connected to the arm 22. The opposite end of the spring 27 is secured to an eye bolt 31 attached to the upright portion 20.

Counterclockwise movement of the arm 22 is limited by a stop screw 32. The stop screw 32 is a cap screw which is threaded through an opening in a bracket 33. The bracket 33 is welded to the base 17. The stop screw 32 is secured in an adjusted position by a lock nut 34. The spring 27 is of sufficient strength to move the linkage 12 and firmly apply the brakes when the arm 22 is moved to the screw 32.

Figure 2:
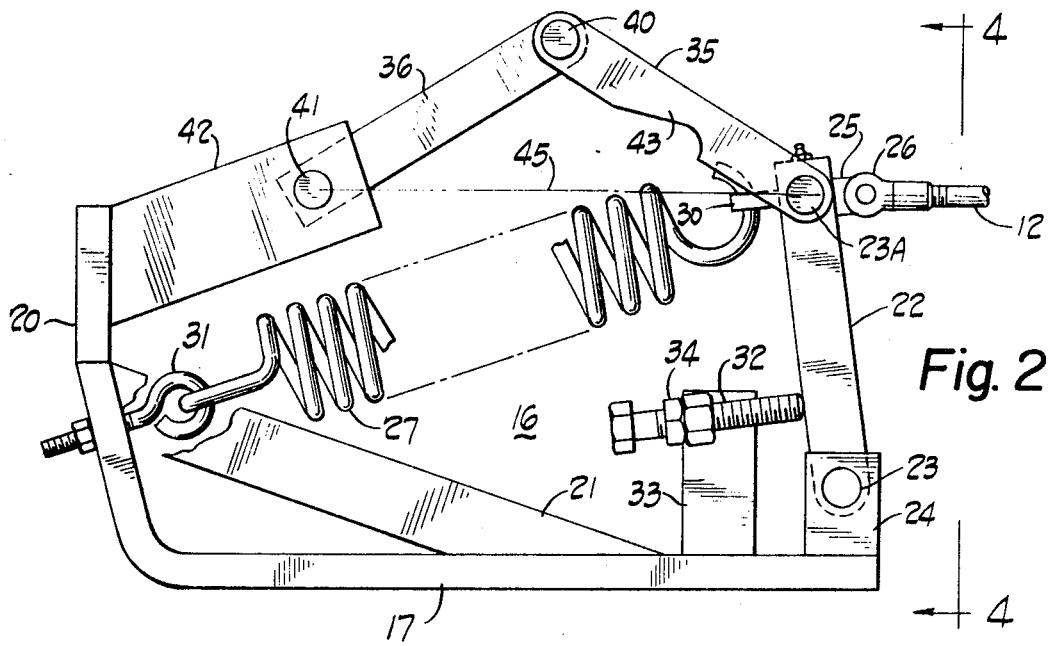
FIG. 2 is a fragmentary side elevational view of linkage for controlling the brakes of the lift truck.
Figure 3:
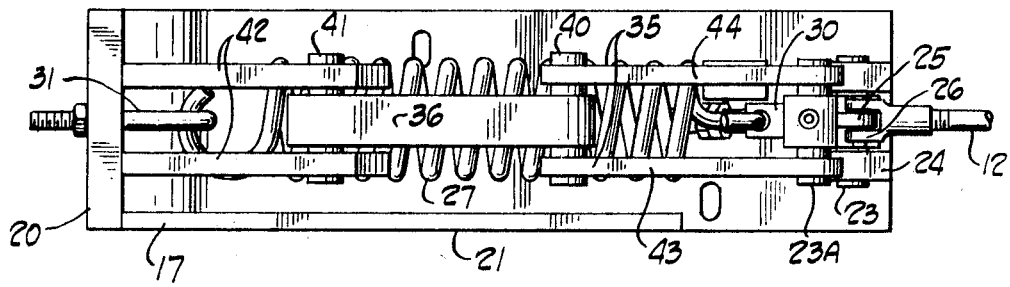
FIG. 3 is a plan view of the linkage shown in FIG. 2.
Figure 4:
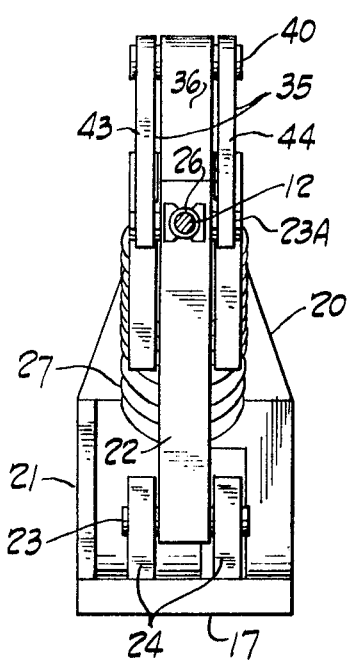
FIG. 4 is an end view of the linkage shown in FIG. 2.

The arm 22 is adapted to be shifted clockwise, as seen in FIGS. 1 and 2, about its pivot from the solid line to the phantom line position of FIG. 1. When the arm 22 is shifted to its phantom position, the linkage 12 is in its brake-release position. This release movement of the arm 22 is accomplished by a toggle joint comprised of two toggle arms 35, 36. The toggle arms 35, 36 are pivotally connected to one another at adjacent ends by a pivot pin 40. The connected ends of the arms 35, 36 for a knee 38 of the toggle joint. The arm 35 is pivotally attached to the arm 22 by the pivot pin 23a. The arm 36 is attached to an anchor bracket 42 by a pivot pin 41.

The arm 35 is formed of two bars 43, 44 which are spaced apart by the pins 23a, 40, while the arm 36 is a single bar extending between the bars 43, 44. The bracket 42 comprises two spaced lugs welded to the upright 20 of the base. The bar 36 extends between these lugs of the bracket 42.

When the spring 27 moves the actuating arm 22 to the stop 32, or nearly so, the arms 35, 36 will be moved to a brake apply position. When in the brake apply position the arms 35, 36 are at an angle considerably less than 180° as seen in FIG. 2. In this position the knee 38 of the toggle joint is raised considerably above the straight line or dead-center position of the toggle joint which is represented by the broken line 45 in FIG. 2 and shown in phantom in FIG. 1.

The operator's seat 11 is provided with an abutment 45. The abutment 45 is in the form of a flange or bar projecting from the bottom of the seat. The bottom edge 46 of the abutment 45 rests on the arm 36 at the knee 38 when the seat 11 is in its brake apply position shown in full lines in FIG. 1 and in its occupied brake-release position which is shown in phantom. When the operator leaves the seat 11, the force of the spring 27 causes the toggle joint to buckle. This raises the toggle knee 38 and the seat upwardly at the same time the link 12 is moved to apply the brakes. When the seat is occupied the weight of the operator depresses the seat and forces the knee 38 of the toggle joint downwardly to the brake-release position.

During movement of the truck over rough surfaces the seat 11 tends to bounce and momentarily raise about its pivot 15 from time to time. Because the knee of the toggle joint can raise an appreciable distance from the position shown in broken lines in FIG. 1 without imparting a corresponding distance of movement to the lever 22, the bouncing movements of the seat 11 are normally insufficient to permit application of the brakes by the force of the spring 27. Furthermore, when the knee of the toggle joint is in its depressed position with the toggle arms 35, 36 nearly straight, the vertical component of force of the spring 27 acting at the knee is relatively light. Thus, the tendency of the force of spring 27 to accentuate bouncing movements of the seat 11 is minimal.

It will be appreciated that the brake-applying mechanism 16 can be conveniently assembled to the base 17 which may then be installed on the truck by routine procedures. Among other advantages, this permits the deadman seat device to be offered as an accessory. It can be readily installed in the field on trucks which have not been equipped with deadman brake arrangements. The fact that the operating connection between the seat 11 and the actuating mechanism 16 is effected by the abutment 45 merely resting on the toggle joint knee facilitates the installation of the mechanism on the truck and also permits the hood 13 with the seat thereon to be temporarily removed to its open position and replaced without specifically uncoupling and recoupling the seat with the brake actuating mechanism.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a fork-lift truck having a brake system and a seat movably mounted on the truck for movement from an occupied position to an unoccupied position, an improved deadman seat arrangement comprising:
   a. a brake application mechanism mounted on the truck and connected to the brakes so as to control their application;
   b. structure including linkage means interposed between the seat and said brake application mechanism for actuating said brake application mechanism so as to apply the brakes when the seat is moved from its occupied position to its unoccupied mechanism;
   c. biasing means connected to said linkage means and normally biasing said linkage means toward a brake applied position;
   d. said linkage means being arranged to shift said brake application mechanism from its brake applied position to a brake release position against the action of the biasing means upon movement of the seat from its unoccupied to its occupied position; and,
   e. said linkage means being constructed such that the rate of movement of said brake application mechanism increases throughout its brake application movement as said linkage means is shifted from its brake release to its brake applied position whereby the amount of seat movement that can be accommodated by the deadman brake arrangement as the truck traverses rough terrain or the like is maximized.

2. The fork-lift truck of claim 1, wherein said linkage means comprises a pair of arms pivotally connected together near adjacent end portions and movable from a position of one relative angle when in the brake release position to a more acute relative angle when in the brake-applied position, said connected end portions being coupled to the seat and other end portions of one of the arms being coupled to said brake application mechanism.

3. The fork-lift truck of claim 2, wherein said arms are substantially in alignment when in the brake-release position.

4. In a vehicle having a frame structure, an operator's seat movable relative to the frame structure between occupied and unoccupied positions, and a brake system, and improved deadman brake control system for applying the brakes at an increasing rate as the seat moves from the occupied position to the unoccupied position, comprising:
   a. a toggle joint formed by two arms pivotally connected at adjacent ends and having opposite ends movable away from each other during movement of said arms toward the deadcenter position of said toggle joint, and movable toward each other during buckling movement of said toggle joint;
   b. seat connection means interconnecting the seat and the connected ends of said arms such that buckling of said toggle joint elevates the seat, and depression of the seat moves said arms toward the deadcenter position of said toggle joint;
   c. actuating means interconnecting the brake system and said toggle joint so as to actuate the brakes in response to movement of said opposite ends toward each other, and to release the brakes in response to movement of said opposite ends away from each other;
   d. biasing means biasing said opposite ends toward each other so as to effect actuation of the brakes and so as to buckle said toggle joint to thereby elevate the seat;
   e. whereby said toggle joint serves to regulate the rate of application of the biasing force of said biasing means to the brake system in accordance with the position of the seat so as to apply the brakes at an increasing rate throughout brake application movement as the seat moves progressively toward the unoccupied position thereby maximizing the amount of seat movement that can be accommodated without significant brake application as the vehicle traverses rough terrain which causes the seat to oscillate toward the unoccupied position.

5. The vehicle of claim 4, wherein:
   a. said actuating means connects with one of said opposite ends of said arms; and
   b. an anchor means anchors the other of said opposite ends to said frame structure.

6. The vehicle of claim 5, wherein said seat connection means comprises an abutment means on the seat resting on said toggle joint at the position of interconnection of said arms.

7. The vehicle of claim 5, wherein the frame structure includes a base structure supporting said anchored end and supporting at least a portion of said actuating means, said biasing means comprising spring means connected at one end to said base structure and at the other end with said actuating means.

8. The vehicle of claim 4, additionally including stop means to limit the movement of said actuating means by said biasing means.

9. In a vehicle having a frame structure, an operator's seat movable relative to the frame structure between occupied and unoccupied positions, and a brake system, an improved deadman brake control system for applying the brakes at an increasing rate as the seat moves from the occupied position to the unoccupied position, comprising:
  a. a toggle joint formed by two arms pivotally connected at adjacent ends;
  b. means connecting said toggle joint to the frame structure to the operator's seat, and to the brake system such that the brakes are released during movement of said arms toward the deadcenter position of said toggle joint, and such that the brakes are applied during buckling movement of said toggle joint, said means comprising:
    i. seat connection means interconnecting the seat and the connected ends of said arms such that buckling of said toggle joint moves the seat toward the unoccupied position, and movement of the seat toward the occupied position moves said arms toward the deadcenter position of said toggle joint;
    ii. anchor means anchoring the other end of one of said arms to the frame structure;
    iii. actuating means movably supporting the other end of the other of said arms for movement relative to the frame structure and connecting with the vehicle brake system so as to apply the brakes when said actuating means moves toward the anchored end of said toggle joint during buckling of said toggle joint and to release the brakes when said actuating means moves away from said anchored end;
  c. spring means biasing said arms away from the deadcenter position of said toggle joint so as to move the seat to the unoccupied position and effect application of the brakes; and;
  d. the rate of application of the brakes being controlled by the aforedescribed arrangement of said toggle joint such that initial movement of the seat toward the unoccupied position will result in a slower brake application rate than will each successive increment of seat movement throughout brake application movement, whereby said toggle joint regulates the application of the biasing force of said spring means to the brake system so as to apply the brakes with increasing force as the seat moves progressively toward the unoccupied position.

10. The vehicle of claim 9, wherein said seat connection means comprises an abutment means on the seat resting on said toggle joint at the position of interconnection of said arms.

11. The vehicle of claim 9, wherein additionally including the stop means to limit the movement of said actuating means by said biasing means.

12. In a fork-lift truck having a supporting frame, an operator's seat movably carried on the frame for movement between an occupied position and an unoccupied position, and a brake system, an improved deadman brake control system for applying the brakes at an increasing rate as the seat moves from the occupied position to the unoccupied position, comprising:
  a. linkage means having input and output portions, said input portion being movable between first and second position, said output portion being movable respectively between third and fourth positions in response to movement of said input portion between said first and second positions;
  b. said linkage means being arranged such that each successive increment of movement of said input portion during movement from said first position to said second position will cause an increasingly greater corresponding increment of movement of said output portion, whereby the initial movement of said input portion will result in a relatively small corresponding output portion movement, but the final movement of said input portion will result in a relatively large corresponding output portion movement;
  c. seat connection means interconnecting the seat and said input portion such that said input portion is in said first position when the seat is in the occupied position, and said input portion is in said second position when the seat is in the unoccupied position;
  d. actuating means interconnecting the brake system and said output portion such that the brakes are released when said output portion is in said third position, and brake application is effected when said output portion is in said fourth position; and,
  e. biasing means biasing said input portion to said second position and said output portion to said fourth position;
  f. whereby said linkage serves to regulate the rate of application of the biasing force of said biasing means to the brake system in accordance with the position of the seat so as to apply the brakes at an increasing rate as the seat moves progressively toward the unoccupied position thereby maximizing the amount of seat movement that can be accommodated without significant brake application as the vehicle traverses rough terrain which causes the seat to oscillate toward the unoccupied position.

13. The fork lift truck of claim 12, wherein said linkage means comprises a pair of arms pivotally connected together at adjacent ends, said connected ends comprising said input portion, the other end of the one of said arms comprising said output portion, said arms being movable between a brake release position of one relative angle, and a brake application position of a more acute angle.

14. The fork lift truck of claim 13, wherein said arms are substantially in alignment when in said brake release position.

15. In a vehicle having a frame structure, an operator's seat movable relative to the frame structure between occupied and unoccupied positions, and a brake system, an improved deadman brake control system for applying the brakes as the seat moves from the occupied position to the unoccupied position, comprising:
  a. a toggle joint having two arms pivotally connected near adjacent ends and having opposite ends movable away from each other during movement of said arms toward a dead center position of said toggle joint, and movable toward each other during buckling movement of said toggle joint;
  b. connection means pivotally connecting said arms to said frame near said opposite ends while permitting relative buckling movement of the arms;
  c. seat connection means interconnecting the seat and the arm connection such that buckling of said toggle joint elevates the seat, and depression of the seat moves said arms toward the dead center position of said toggle joint;
  d. actuating means interconnecting the brake system and said toggle joint so as to actuate the brakes in response to movement of said opposite ends toward each other, and to release the brakes in response to movement of said opposite ends away from each other;
  e. a spring biasing means connected to and biasing said opposite ends toward each other so as to effect actuation of the brakes and so as to buckle said toggle joint to thereby elevate the seat;
  f. whereby as said toggle joint approaches its dead center position, the force exerted by said biasing means through said toggle joint upon the seat decreases so as to minimize the upward force exerted on the seat when the seat is in the occupied position.

16. The vehicle of claim 15, wherein said toggle joint serves to regulate the rate of application of the biasing force of said biasing means to the brake system in accordance with the position of the seat so as to apply the brakes at an increasing rate throughout brake application movement as the seat moves progressively upwardly toward the unoccupied position, whereby the amount of seat movement that can be accommodated without significant brake application is maximized, while the effective force on the occupied seat tending to cause the operator to bounce as the vehicle traverses rough terrain is minimized.

17. The fork lift truck of claim 15, wherein said arms are substantially in alignment when in said brake release position.

18. The device of claim 15, wherein said connection means comprises a pivot connecting one of the arms to the frame and a link pivotally connected to the frame and to the other of the arms.

19. In a vehicle having a frame structure, an operator's seat movable relative to the frame structure between occupied and unoccupied positions, and a brake system, an improved deadman brake control system for applying the brakes as the seat moves from the occupied position to the unoccupied position, comprising:

a. a toggle joint having two arms pivotally connected near adjacent ends and having opposite ends movable away from each other during movement of said arms toward a dead center position of said toggle joint, and movable toward each other during buckling movement of said toggle joint;

b. seat connection means interconnecting the seat and the arm connection such that buckling of said toggle joint elevates the seat, and depression of the seat moves said arms toward the dead center position of said toggle joint;

c. actuating means interconnecting the brake system and said toggle joint so as to actuate the brakes in response to movement of said opposite ends toward each other, and to release the brakes in response to movement of said opposite ends away from each other;

d. a tension coil spring biasing said opposite ends toward each other so as to effect actuation of the brakes and so as to buckle said toggle joint to thereby elevate the seat;

e. said coil spring positioned so as to intersect the line of movement of said connection such that should said arms of said toggle joint tend to move past said dead center position, said toggle joint will engage said spring at a position intermediate its ends;

f. whereby as said toggle joint approaches its dead center position, the force exerted by said biasing means through said toggle joint upon the seat decreases so as to minimize the upward force exerted on the seat when the seat is in the occupied position.

* * * * *